No. 891,368. PATENTED JUNE 23, 1908.
W. B. POTTER.
MEANS FOR PREVENTING REVERSING OF AN EXPLOSIVE ENGINE.
APPLICATION FILED NOV. 26, 1904.
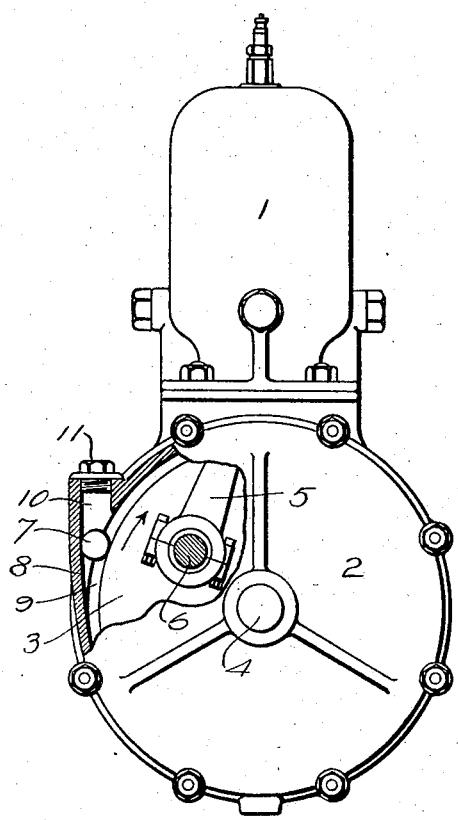
Witnesses:
Harold F. Locke
Helen Oxford
Inventor:
William B. Potter.
by Albert G. Davis
Att'y.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

MEANS FOR PREVENTING REVERSING OF AN EXPLOSIVE-ENGINE.

No. 891,368.            Specification of Letters Patent.        Patented June 23, 1908.

Application filed November 26, 1904. Serial No. 234,379.

*To all whom it may concern:*

Be it known that I, WILLIAM B. POTTER, a citizen of the United States, residing at Schenectady, county of Schenectady, State of New York, have invented certain new and useful Improvements in Means for Preventing Reversing of an Explosive-Engine, of which the following is a specification.

In operating an explosive engine the charge of mixture sometimes ignites at such a point in the compression stroke of the piston that the impulse of the exploding gases causes "kicking back" or reversing of the direction of rotation of the operating parts. This action sometimes takes place, particularly on automobile and launch engines, when the operator is endeavoring to start the engine by hand, and under such circumstance may cause painful and even serious accidents.

It is the object of my invention to prevent such accidents, by providing means which is sensitive to any tendency to reverse movement of the working parts of the engine, and which operates as an automatically-actuated clutch or brake to prevent such reverse movement.

The details of the invention will be explained in the following description, taken in connection with the accompanying drawing, and the novel features thereof will be set forth in the appended claims.

In the drawing, which illustrates one embodiment of the invention, is shown an internal combustion engine in elevation, with a part of the crank casing broken away to show the invention applied thereto.

Broadly the invention comprises a means which coöperates with a stationary abutment and a rotating member, such as the crank disk of fly-wheel that rotates with or is rotated by the crank shaft, the said means being operated by the rotating member so as to wedge or frictionally engage between the latter and the abutment for preventing rotation of the member in a direction opposite to that in which it is intended normally to rotate. In the present case I have elected to illustrate the anti-reversing means as coöperating with the crank disk and relying upon the same for its operation.

Referring to the drawing, 1 represents a piston cylinder of an explosion or internal combustion engine of the single cylinder type, and 2 a closed crank casing for splash-lubrication. Within the casing is a crank disk 3 forming a part of a crank shaft 4, and connected with the piston within the cylinder by a connecting rod 5 and a crank pin 6.

Within the casing is provided a wedging or gripping member 7 which loosely rests on the periphery of the crank disk, between the same and an abutment 8 which is formed by the wall of the casing. The normal position of the wedging member 7 can best be determined by experiment; it depends somewhat on the character of the device used. The abutment is a portion of the casing which extends approximately tangentially to the cylindrical wall thereof, and it forms with the periphery of the crank disk a wedge-shaped space 9 in which the member 7 is confined.

Preferably the abutment is formed by a tubular opening 10 cored in the wall of the casing, which serves the double purpose of a filling opening for supplying lubricant to the casing and an opening for permitting the wedging member to be inserted or removed. A removable screw plug or cap 11 is provided for closing the opening and retaining the wedging member in place. The wedging member preferably takes the form of a hard steel ball or roller, although it may be of any other shape and material suitable to frictionally engage with the periphery of the crank disk and stand wear. The crank shaft is intended to normally rotate in the direction indicated by the arrow, and when so rotating the ball, roller, or other device 7, rides freely on the periphery of the crank disk without any wedging action. When preignition occurs the piston receives an impulse which tends to rotate the crank in the direction reverse to that indicated by the arrow, and immediately the crank disk engages with the ball and causes it to be wedged between the abutment or tangential wall of the opening 10 and the periphery of the disk. This wedging action completely arrests the reverse rotation of the crank, so that no ill effects are produced by preignition.

It is to be noted that preignition and the tendency to impart a reverse impulse, occur when the piston or crank is adjacent its inner dead center, which is a position where the effective turning moment is of comparatively small magnitude, hence it requires relatively little friction between the wedging member and the crank disk to hold the operating parts stationary. When the piston is thus prevented from moving under the expansive force of the preignited gases, the energy of the latter passes off through the cooling jacket, as heat. After the gases have spent their force, the cause of preignition may be remedied and the engine started in the proper manner.

While I have described the wedging member as located so as to engage with the periphery of the crank disk, it may be arranged to act upon either of its flat side surfaces with substantially the same effect.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an engine, the combination of a crank disk having a finished periphery, a stationary abutment, and a wedging means loosely held between said disk and the abutment for preventing reverse movement of the former.

2. In an engine, the combination of a crank casing, a rotating element therein, a stationary abutment on the casing coöperating with said element to form a wedge-shaped space, and a wedging member in said space for preventing the element from rotating in one direction.

3. In an engine, the combination of a crank casing, a rotating element therein, a stationary abutment formed by said casing which extends approximately tangentially to the periphery of the rotating element, and a loose wedging member resting between the abutment and the element for preventing the latter from rotating in a reverse direction.

4. In an engine, the combination of a crank disk, a crank casing, an abutment adjacent the periphery of the disk and formed by the casing, and a ball confined between the abutment and the disk for preventing reverse rotation of the latter.

5. In an engine, the combination of a crank disk, a closed crank casing for splash lubrication which is provided with a filling opening, an abutment formed by the casing wall at said opening, a wedging member between the abutment and the disk for preventing reverse rotation of the latter, and a removable cap for the opening.

6. In combination, an engine, a shaft driven by the engine, a member rotating with the shaft, a casing inclosing the shaft and the member, an abutment on the casing adjacent said member, and a ball loosely confined between the abutment and the member for preventing reverse rotation of the shaft when starting the engine.

In witness whereof, I have hereunto set my hand this 23rd day of November, 1904.

WILLIAM B. POTTER.

Witnesses:
 HELEN ORFORD,
 G. C. HOLLISTER.